US 9,194,199 B2

(12) United States Patent
Pantano

(10) Patent No.: US 9,194,199 B2
(45) Date of Patent: Nov. 24, 2015

(54) METHODS AND SYSTEMS OF DOWN-HOLE REAGENT PROCESSING AND DEPLOYMENT

(71) Applicant: John Pantano, Butte, MT (US)

(72) Inventor: John Pantano, Butte, MT (US)

(73) Assignee: John Pantano, Bryan, TX (US)

( * ) Notice: Subject to any disclaimer, the term of this patent is extended or adjusted under 35 U.S.C. 154(b) by 501 days.

(21) Appl. No.: 13/710,364

(22) Filed: Dec. 10, 2012

(65) Prior Publication Data

US 2014/0158358 A1    Jun. 12, 2014

(51) Int. Cl.
 E21B 27/02 (2006.01)
 E21B 43/25 (2006.01)
 C09K 8/60 (2006.01)

(52) U.S. Cl.
 CPC . *E21B 27/02* (2013.01); *C09K 8/60* (2013.01); *E21B 43/25* (2013.01)

(58) Field of Classification Search
 CPC ..... E21B 43/24; E21B 36/008; E21B 43/243; E21B 43/25; E21B 27/02; C09K 8/58; C09K 8/60; C09K 8/64; C09K 8/82; C09K 8/92
 See application file for complete search history.

(56) References Cited

U.S. PATENT DOCUMENTS

| | | | | | |
|---|---|---|---|---|---|
| 4,475,596 | A | * | 10/1984 | Papst | 166/303 |
| 5,582,251 | A | * | 12/1996 | Bailey et al. | 166/286 |
| 7,946,342 | B1 | * | 5/2011 | Robertson | 166/272.3 |
| 8,555,969 | B2 | * | 10/2013 | Goodwin et al. | 166/264 |
| 2001/0046414 | A1 | * | 11/2001 | Kinsman | 405/128.75 |
| 2003/0080604 | A1 | * | 5/2003 | Vinegar et al. | 299/14 |
| 2008/0066904 | A1 | * | 3/2008 | Van Hal et al. | 166/250.1 |
| 2009/0305915 | A1 | * | 12/2009 | Huang et al. | 507/265 |
| 2011/0203797 | A1 | * | 8/2011 | Alexandrov et al. | 166/300 |
| 2012/0145400 | A1 | * | 6/2012 | Harrison et al. | 166/305.1 |
| 2012/0285695 | A1 | * | 11/2012 | Lafferty et al. | 166/310 |
| 2014/0158358 | A1 | * | 6/2014 | Pantano | 166/300 |
| 2014/0318798 | A1 | * | 10/2014 | Mancini et al. | 166/335 |
| 2015/0068749 | A1 | * | 3/2015 | Wernimont | 166/300 |

* cited by examiner

*Primary Examiner* — Daniel P Stephenson
(74) *Attorney, Agent, or Firm* — Joseph Stecewycz

(57) ABSTRACT

The invention is a processing vessel having an outer container enclosing a reaction/mixing/delivery chamber with a mixing motor and a delivery pump for delivering a chemical formulation product produced in the reaction/mixing/delivery chamber to a subterranean location.

19 Claims, 10 Drawing Sheets

METHODS AND SYSTEMS OF DOWN-HOLE REAGENT PROCESSING AND DEPLOYMENT

FIELD OF THE INVENTION

The present invention relates to a method and system for safely conducting a chemical reaction at a project site and remotely delivering a chemical formulation product.

BACKGROUND OF THE INVENTION

It is known in the relevant art that specified chemical compounds can be used to improve well stimulation. However, the transportation, storage, mixing, and delivering of the stimulation chemicals to subsurface has many issues. Highly reactive materials have even more issues when safety concerns are factored. It is problematic if a specified chemical is unstable at the surface. This instability can cause health, safety and/or environmental problems.

One method of reducing such risks is to produce the required, unstable chemical compounds in close proximity to the stimulation chemical delivery location, which is usually a remote location. Thus, if a problem resulting from chemical instability were to occur, the problem would be essentially confined to the well location. There would be a small risk of negatively impacting a local environment, and use of the chemical under such controlled conditions would deem it to be less of a hazard.

In the case of a remote or hazardous location, the option of creating a chemical downhole has advantages. Chemical reactions at high temperature and pressure can benefit from being formed in a borehole where high pressures and temperatures co-exist. Electrical power is used for processing certain useful chemicals. Power generation on a remote rig is not an issue. Raw materials for many chemicals are present in sea water or can be mined proximal to the rig. Using resources proximal to remote site has many beneficial characteristics.

BRIEF SUMMARY OF THE INVENTION

In one aspect of the present invention, a reagent processing vessel comprises: an outer container; a reaction chamber disposed in the outer container; a mixing chamber disposed in the outer container, the mixing chamber in physical communication with the reaction chamber so as to allow transfer of a substance between the reaction chamber and the mixing chamber; a delivery chamber disposed in the outer container, the delivery chamber in physical communication with the mixing chamber as to allow transfer of a substance between the mixing chamber and the delivery chamber; and at least one of a mixing motor and a delivery pump.

In another aspect of the present invention, a reagent processing and delivery system comprises: a control station; an outer container including a reaction chamber for receiving initial chemical substances; a mixing chamber in physical communication with the reaction chamber so as to allow transfer of an ingredient reagent produced in the reaction chamber into the mixing chamber; a delivery chamber in physical communication with the mixing chamber so as to allow transfer of a chemical formulation product produced in the mixing chamber into the delivery chamber; a flow control barrier in physical communication with the delivery chamber so as to enable expulsion of the chemical formulation product into a subterranean location; and an electrical cable electrically connected between the control station and the outer container so as to provide electrical power and control signals to at least one of the reaction chamber, the mixing chamber, and the delivery chamber.

In yet another aspect of the present invention, a method comprises the steps of: providing a reagent processing vessel; delivering at least one initial chemical substance to the reagent processing vessel; conducting a chemical reaction to produce an ingredient reactant in the reagent processing vessel; mixing the ingredient reactant with a carrier fluid to produce a chemical formulation product; and expelling the chemical formulation product from the reagent processing vessel into a subterranean location.

The additional features and advantage of the disclosed invention is set forth in the detailed description which follows, and will be apparent to those skilled in the art from the description or recognized by practicing the invention as described, together with the claims and appended drawings.

BRIEF DESCRIPTIONS OF THE DRAWINGS

The foregoing aspects, uses, and advantages of the present invention will be more fully appreciated as the same becomes better understood from the following detailed description of the present invention when viewed in conjunction with the accompanying figures, in which.

DETAILED DESCRIPTION OF THE INVENTION

Figure 1:
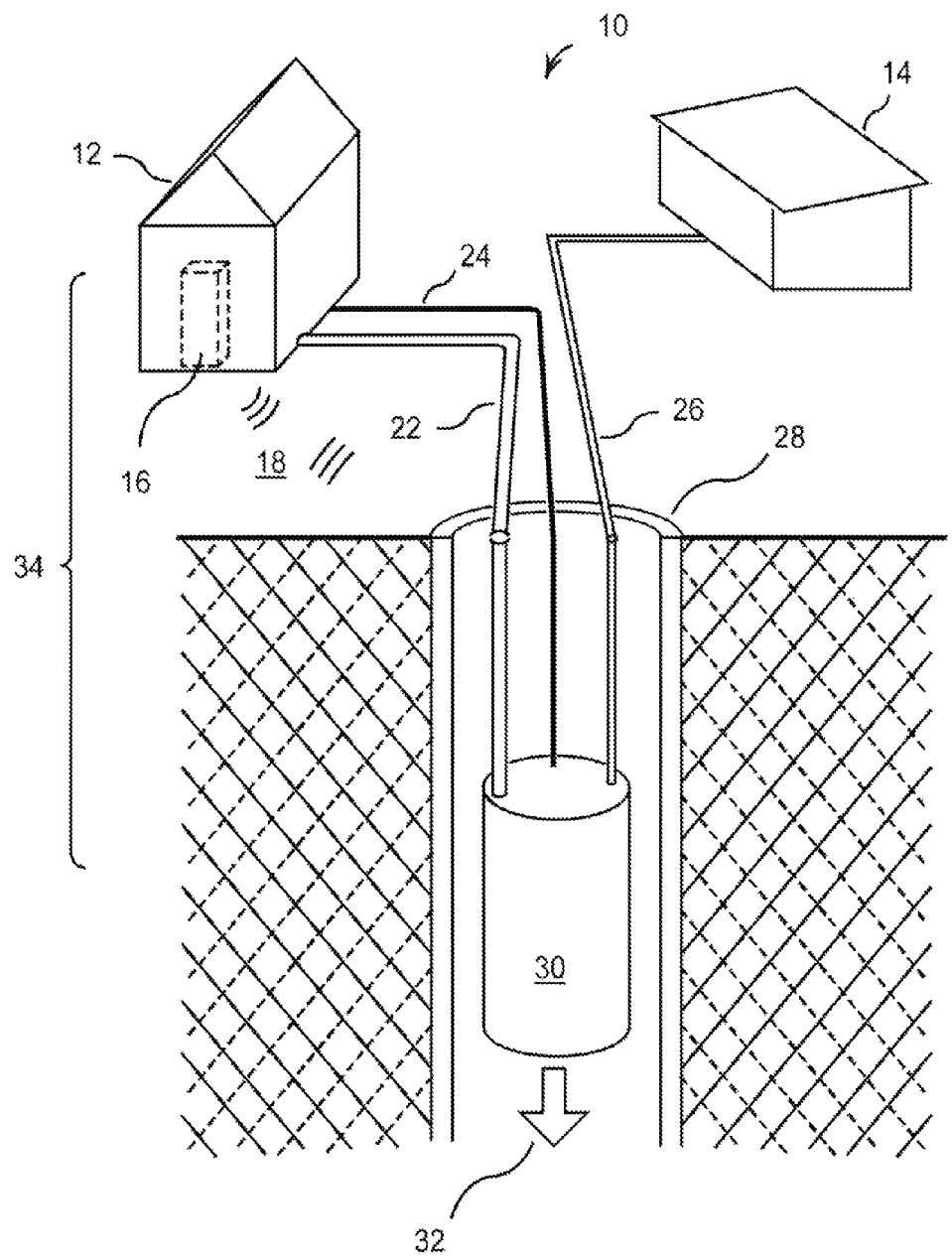
FIG. 1 is a diagrammatical illustration of a reagent processing and delivery system comprising a control facility and a reagent processing vessel adapted for vertical orientation in a downhole or well site, in accordance with one aspect of the present invention.

The following detailed description is of the best currently contemplated modes of carrying out the invention. The description is not to be taken in a limiting sense, but is made merely for the purpose of illustrating the general principles of the invention.

The present invention relates generally to a unique method for delivering chemical compounds, including highly reactive chemicals, to a subterranean location, such as a downhole site or a horizontal casing. Delivery of such specified chemical compounds may be intended for effecting increased oil production from a well, for example. Other examples include unique systems and methods to prepare specified, useful chemicals in the well bore itself. Further embodiments, forms, objects, features, advantages, aspects, and benefits shall become apparent from the following description and drawings.

The disclosed method functions to build, and then utilize, one or more tools that are configured for the project site location, such as an oil well. The emplaced tools function to produce chemicals, or a more useable form of chemical, for example, that will increase resource recovery. The invention can also be modified for use in harvesting other resources, such as in the mining industry, or in an environmental remediation project. Oil and gas reservoirs that may not otherwise have been economical sites for resource extraction can become profitable when a more reactive mixture of chemicals is used for resource recovery. Another important factor is that health, safety and environmental risks from such reactive mixtures are reduced with the disclosed system and method.

The basic concept underlying the present invention is the process of constructing and utilizing on-site a reagent processing vessel having contained therein selected ingredient reagents that, once the reagent processing vessel is emplaced, a pre-specified chemical reaction or processing can be initiated to transform the ingredient reagents to a useful end product. After the end product has been produced inside the reagent processing vessel, the reagent processing vessel operates to eject the end product. For example, the reagent processing vessel can be emplaced in a well bore to release a stimulation mixture and enable the additional recovery of underground resources. Accordingly, the disclosed reagent processing vessel can be configured for emplacement into a bore hole having a diameter ranging from less than four to greater than twenty inches.

For example, a container or vessel that can be used to process raw materials to form elemental sodium and potassium, for example, may be constructed and deployed downhole or in a casing, where the container or vessel is adapted to receive raw material(s) to produce a sodium-potassium alloy. In addition, the container or vessel can receive or store carrier fluid for mixing with the sodium-potassium alloy to form a regent mixture (dispersion) at the appropriate concentration and size of alloy particles. A delivery pump, controlled and powered from the surface control facility, delivers the reagent mixture to a sub-terranean formation, that is, through the borehole, and into the subterranean formation at a specified rate and pressure of flow. For examples of chemical reactions that may be conducted in the disclosed system, refer to co-pending patent application Ser. No. 13/237,718.

The container or vessel can be deployed in a horizontal well that is thousands of feet long. The container or vessel may be connected to a surface control facility by means of a supply pipe, a disposal pipe, and a wired electrical conduit. The container or vessel may comprise an internal anode/cathode module supplied with electrical power at an appropriate time. The container or vessel may further comprise a series of valves and solenoids that are used to control other features required for the processing. Sensors in the container or vessel, for example, can be used to record appropriate ambient environmental conditions, such as temperature and pressure.

In an exemplary embodiment, a sodium chloride (NaCl) solution may be sent down the supply pipe. Current may be applied to the cathode and anode via the wired electrical conduit. In the disclosed method, sodium metal may be produced and retained within the container or vessel, and waste chlorine may be transferred to a surface facility for disposal. The sodium metal may be mixed with a carrier fluid inside the container or vessel, and injected into the sub-terranean formation.

There is shown in FIG. 1 a down-hole reagent processing and deployment (RPD) system 10, in accordance with an aspect of the present invention. The RPD system 10 comprises an RPD power and control facility 12 functioning to provide one or more ingredient chemical components to a reagent processing vessel 30 via a chemical supply line 22. Accordingly, the RPD power and control facility 12 provides for a human machine interface (HMI) for monitoring sensors and manipulating the RPD system 10.

The reagent processing vessel 30 may be deployed in a downhole site 28, such as for example, in a vertical or an angled orientation in an oil well. In such applications, the reagent processing vessel 30 may be fabricated in a cylindrical configuration having an essentially circular cross sectional shape. However, it should be understood that the present invention is not limited to a vessel configuration of any particular geometric shape, and may be fabricated having an exterior surface shaped for optimal adaptation to a particular deployment location, as may be envisioned by structural designers and manufacturing engineers.

The reagent processing vessel 30 may be operated by personnel manning a control station 16 in the power and control facility 12. Two-way communication between the control station 16 and the reagent processing vessel 30 may be provided via an electrical cable 24 connected to a control module 38 (shown in FIG. 3) in the reagent processing vessel 30. In an exemplary embodiment, the reagent processing vessel 30 may further be responsive to wireless communication signals transmitted via an electromagnetic (EM) wireless link 18. It can be appreciated that the wireless link 18 may be used in conjunction with, or in place of, the electrical cable 24. The electrical cable 24 may comprise a plurality of electrical conductors suitable for transmitting and receiving one or more of control signals, feedback signals, and electrical power between the reagent processing vessel 30 and the RPD power and control facility 12.

The reagent processing vessel 30 may be configured and adapted for receiving one or more substances, ingredient chemicals, and/or chemical compounds from the RPD power and control facility 12, performing one or more chemical reactions or material processing actions within one or more chambers inside the reagent processing vessel 30 as described in greater detail below, and delivering a desired chemical formulation product 32, such as for example, a chemical stimulation product, into the downhole site 28.

The RPD system 10 may also include a waste disposal facility 14 physically connected to the reagent processing vessel 30 via a disposal line 26, for receiving waste from chemical processes conducted inside the reagent processing vessel 30, as explained in greater detail below. In an alternative embodiment, the reagent processing vessel 30 may expel some or all the chemical process waste into the downhole site 28.

Figure 2:
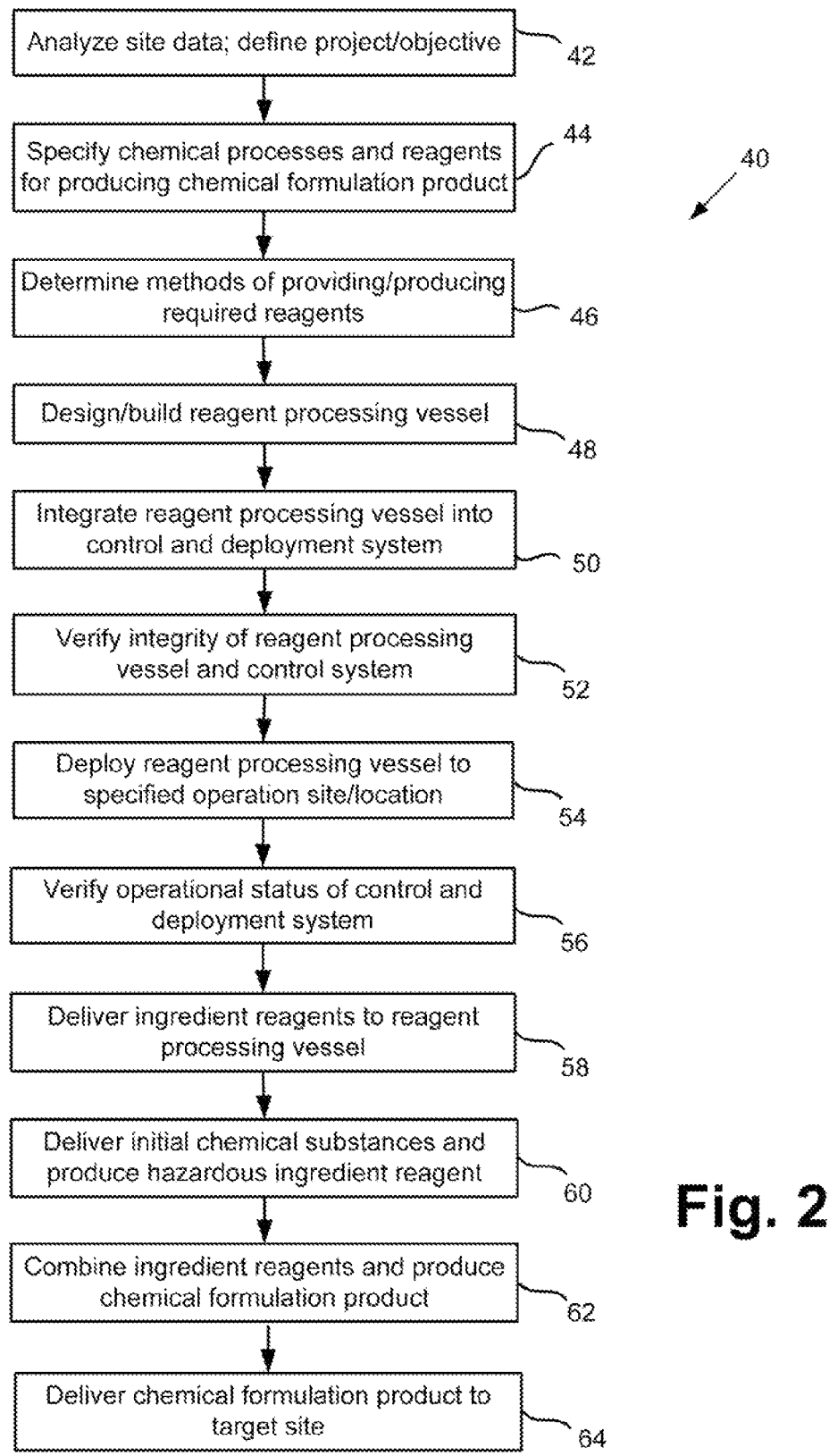
FIG. 2 is a flow chart illustrating operation of the reagent processing and delivery system of FIG. 1.

In an exemplary embodiment, the RPD system 10 may operate in accordance with a flow chart 40, shown in FIG. 2. A project team may analyze site data related to one or more projects being conducted at the downhole site 28, at step 42. This may include, for example, addressing the challenge of increasing yield at a resource extraction facility by delivering the chemical formulation product 32 to enable or increase the efficiency of the resource extraction process. One or more candidate chemical processes for producing the chemical formulation product 32 may be evaluated, and the team may select a chemical process or material processing action for achieving the desired results. When the chemical process to be performed inside the reagent processing vessel 30 has been selected, the required ingredient reagents for producing the chemical formulation product 32 may be specified, at step 44.

One or more methods of inserting or providing the required ingredient reagents in the reagent processing vessel 30 may be researched, evaluated, and selected at step 46. In an exemplary embodiment, the required ingredient reagents may be delivered to the reagent processing vessel 30 via the chemical supply line 22. That is, a one-step process may be used to produce the chemical formulation product 32:

ingredient reagents $A+B+C \rightarrow$ chemical formulation product

In alternative embodiment, initial chemical substances may be delivered to the reagent processing vessel 30, and one or more of the required ingredient reagents may then be produced inside the reagent processing vessel 30 from the one or more initial chemical substances, as described in greater detail below. The ingredient reagent produced inside the reagent processing vessel 30 may then be combined with other ingredient reagents separately delivered to the reagent processing vessel 30 to produce the chemical formulation product 32. That is, an alternative two-step process may be used to produce the chemical formulation product 32:

initial chemical substances $D+E \rightarrow$ ingredient reagent $F$ ingredient reagents $F+G+H \rightarrow$ chemical formulation product For example, a sodium-potassium alloy may be used in certain downhole applications. As is known in the relevant art, the sodium-potassium alloy is extremely hazardous and requires special handling. Accordingly, it is advantageous to utilize the reagent processing vessel 30 for producing the sodium-potassium alloy inside the reagent processing vessel 30. In such an application, initial chemical components (e.g., elemental sodium and elemental potassium) may be placed into the reagent processing vessel 30, and the sodium-potassium alloy (i.e., an ingredient reagent) may be produced for use inside the reagent processing vessel 30, rather than having the hazardous sodium-potassium alloy provided via the chemical supply line 22.

The reagent processing vessel 30 may be designed, at step 48, so as to meet the requirements of the chemical processes determined in step 44. If required, the reagent processing vessel 30 may be designed so as to also meet the requirements of reagent production in the reagent processing vessel 30, identified in step 46. The reagent processing vessel 30 may then be fabricated in accordance with a selected reagent processing vessel design. Exemplary embodiments of reagent processing vessels are shown in FIGS. 3, 4, 6, and 7, below.

Once designed, the reagent processing vessel 30 may be electronically and functionally integrated with the control station 16 to form a control and deployment system 34, at step 50. Bench testing or computer simulation may be conducted to verify the integrity of the control and deployment system 34, at step 52, as is well known in the relevant art. When qualified, the reagent processing vessel 30 may be placed into inventory, or deployed to a target site such as the downhole site 28, at step 54.

Upon deployment, the operational status of the reagent processing vessel 30 may be verified, at step 56. In an exemplary embodiment, when the operational status of the deployed reagent processing vessel 30 has been established, the personnel manning the control station 16 may initiate one or more pre-specified actions. The specified ingredient reagents may be delivered to the reagent processing vessel 30, at step 58, to initiate a specified chemical reaction.

If the specified chemical reaction requires a hazardous substance for an ingredient reagent, pre-determined initial chemical substances may be delivered to the reagent processing vessel 30 and the hazardous ingredient reagent may be produced, at step 60. At step 62, all ingredient reagents may then be combined so as to produce the chemical formulation product 32. The chemical formulation product 32 may be delivered to the downhole site 28 at step 64.

In an exemplary embodiment, the control station 16 may control one or more of: (i) reagent production processes, (ii) other chemical processes, and (iii) delivery of the chemical formulation product 32. In an alternative embodiment, one or more of the reagent processes, the chemical processes, and the delivery of the chemical formulation product 32, may be controlled internally within the reagent processing vessel 30, as explained in greater detail below.

Figure 3:
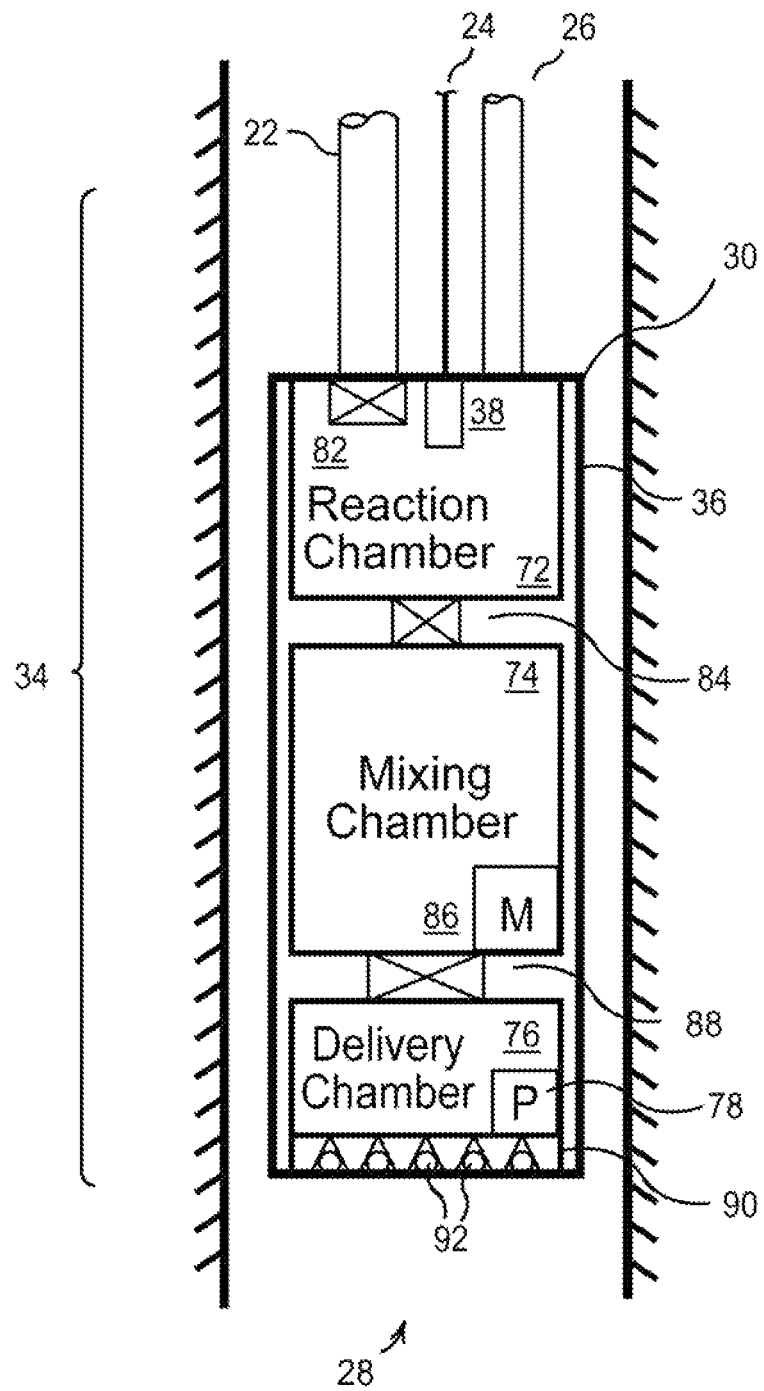
FIG. 3 is a cross-sectional diagram of an exemplary embodiment of the reagent processing vessel of FIG. 1 showing three internal chambers.

There is shown in FIG. 3 a diagrammatical cross-sectional view of the reagent processing vessel 30. As described above, the reagent processing vessel 30 may be utilized as part of the control and deployment system 34 that includes the control station 16 (shown in FIG. 1) and the chemical supply line 22. The control and deployment system 34 may further comprise one or more of the electrical cable 24, the disposal line 26 and the EM wireless link 18. The reagent processing vessel 30 comprises a reaction chamber 72, a mixing chamber 74, a delivery chamber 76, and a flow control barrier 90 disposed inside an outer container 36. A control module 38 provided in the reaction chamber 72 may interface with the control signals transmitted in the electrical cable 24 and/or via the EM wireless link 18.

The outer container 36 may be designed and fabricated to perform at least one of: (i) protecting the reaction chamber 72, the mixing chamber 74, and the delivery chamber 76 from ambient environmental conditions, (ii) providing structural support so as to retain the reaction chamber 72, the mixing chamber 74, and the delivery chamber 76 in relative positions as shown; and (iii) comprising sufficient structural integrity so as to withstand extreme operating environments, such as an ambient pressure of 4000 psi or more, and an ambient temperature of 200° F. or higher. It can be appreciated that providing an outer container design having substantial structural integrity may also allow for re-use of the outer container in subsequent deployments and processing projects.

It should be understood that, although the reaction chamber 72, the mixing chamber 74, and the delivery chamber 76 are shown as arranged in a sequential configuration, the present invention is not limited to an arrangement where the mixing chamber 74 is positioned between the reaction chamber 72 and the delivery chamber 76. For example, the mixing chamber 74 may be positioned "side-by-side" with the reaction chamber 72, and the reagent transfer valve 84 may be located between the mixing chamber 74 and the reaction chamber 72.

As can be appreciated by one skilled in the art, the required ingredient reagents selected in step 44, above, may be delivered to the reaction chamber 72 via the chemical supply line 22. A chemical supply valve 82 may be used to control the ingredient reagent influx to the reaction chamber 72. A chemical transfer valve 84 may be used to transfer the ingredient reagents from the reaction chamber 72 to the mixing chamber 74. The materials used in constructing the reagent processing vessel 30 are preferably selected based on the compatibility of the construction materials with the chemicals, pressures, and temperature condition requirements imposed on the reagent processing vessel 30 as the required chemical reactions are performed.

Initial chemical substances selected in step 44, above, may be delivered to the reaction chamber 72, and reacted to produce the hazardous ingredient reagent, in accordance with step 60, above. The chemical transfer valve 84 may be used to allow transfer of the hazardous ingredient reagent to the mixing chamber 74. When the pre-specified amount and mixture of ingredient reagents have been delivered to the mixing chamber 74, a mixing motor 86 may be activated to mix and combine the ingredient reactants so as to produce the chemical formulation product 32, in accordance with step 62 above.

A product delivery valve 88 may be used to allow transfer of the chemical formulation product 32 to the delivery chamber 76. A delivery pump 78 may be activated, and the flow control barrier 90 may be opened, to effect delivery of the chemical formulation product 32 through an array of one-way flow ports 92 to the downhole site 28, in accordance with step 64, above.

If indication is received at the control station 16 that the desired effect has been achieved, the next phase of operations can be resumed to recover additional resources. Otherwise, the above process steps 58 through 62 can be repeated as needed to inject additional chemical formulation product 32 into the downhole site 28.

Figure 4:
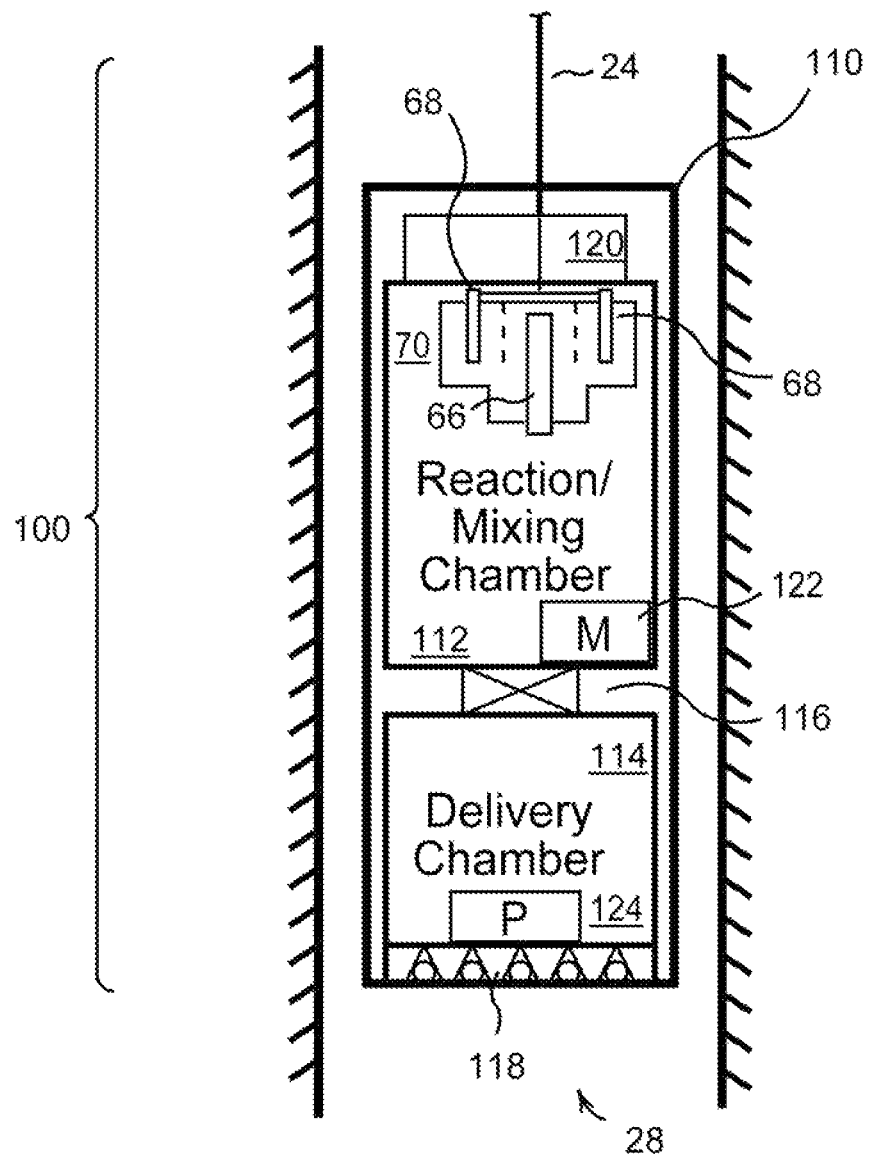
FIG. 4 is a cross-sectional diagram of an exemplary embodiment of the reagent processing vessel of FIG. 1 showing two internal chambers.

In an alternative exemplary embodiment, a reagent processing vessel 110 comprises a reaction/mixing chamber 112 and a delivery chamber 114 with a flow control barrier 118, as shown in FIG. 4. Pre-specified amounts of the ingredient reagents may be disposed in the reaction/mixing chamber 112 before the reagent processing vessel 110 is deployed in the downhole site 28. A crucible 70 may be provided in the reaction/mixing chamber 112 for conducting an electrolysis process, such as a Castner process for manufacturing sodium metal, as described in greater detail below.

The crucible comprises a cathode 66 and an anode 68, both connected to the electrical cable 24 for receiving electrolytic current. The ingredient reagents may be mixed by a mixing motor 122. It can be appreciated by one skilled in the art that the crucible 70 may be included in other reagent processing vessel configurations, including the reagent processing vessel 30 (shown in FIG. 3), the reagent processing vessel 130 (shown in FIG. 6) and the reagent processing vessel 150 (shown in FIG. 7).

A product delivery valve 116 may be used to enable transfer of the chemical formulation product 32 from the reaction/mixing chamber 112 to the delivery chamber 114. A delivery pump 124 may be activated, and the flow control barrier 118 may be opened, to effect delivery of the chemical formulation product 32 into the downhole site 28.

Figure 5:
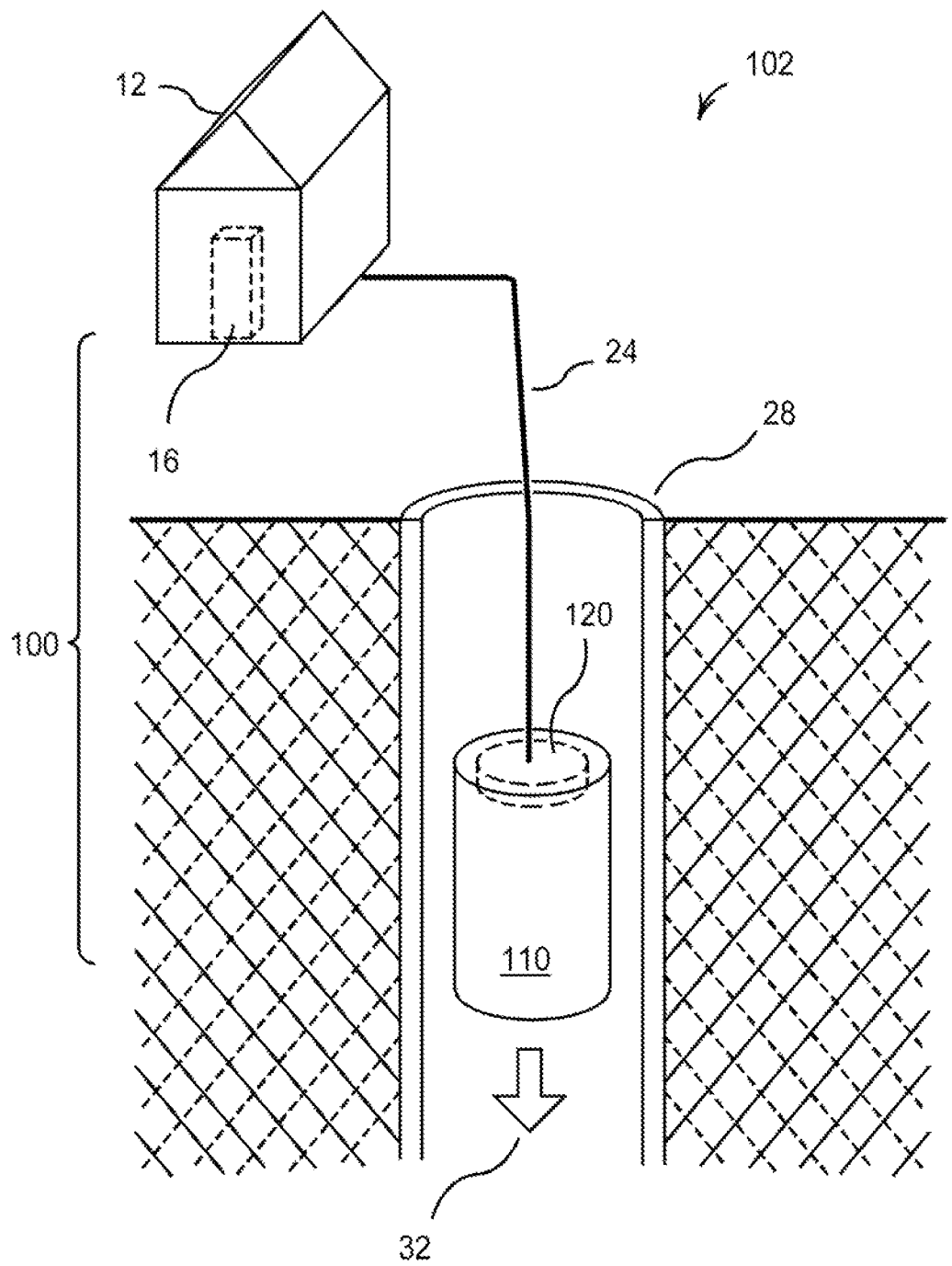
FIG. 5 is a diagrammatical illustration of a reagent processing and delivery system comprising a control facility and the reagent processing vessel of FIG. 4, in accordance with another aspect of the present invention.
Figure 10:
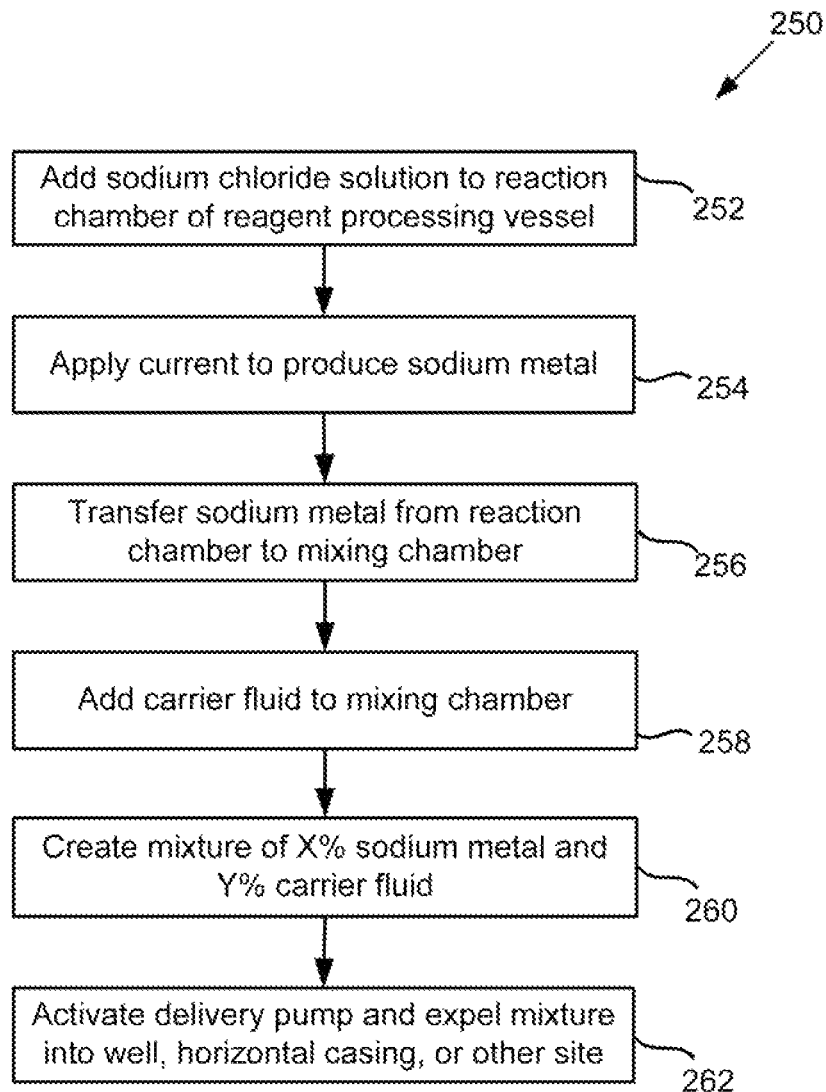
FIG. 10 is a flow diagram illustrating the production of a sodium metal and carrier fluid mixture, in accordance with the functional diagram of FIG. 9.

In an exemplary embodiment, the foregoing actions may be initiated and executed by a control module 120, provided in the reagent processing vessel 110. The control module 120 may be in communication with the control station 16 via the electrical cable 24, as shown in FIG. 5. The reagent processing vessel 110, the control station 16, and the electrical cable thus form a control and deployment system 100 that may be suitable for executing an operation in accordance with the flow chart 40, shown in FIG. 2, a flow chart 200 (shown in FIG. 8), and a flow chart 250 (shown in FIG. 10).

Figure 6:
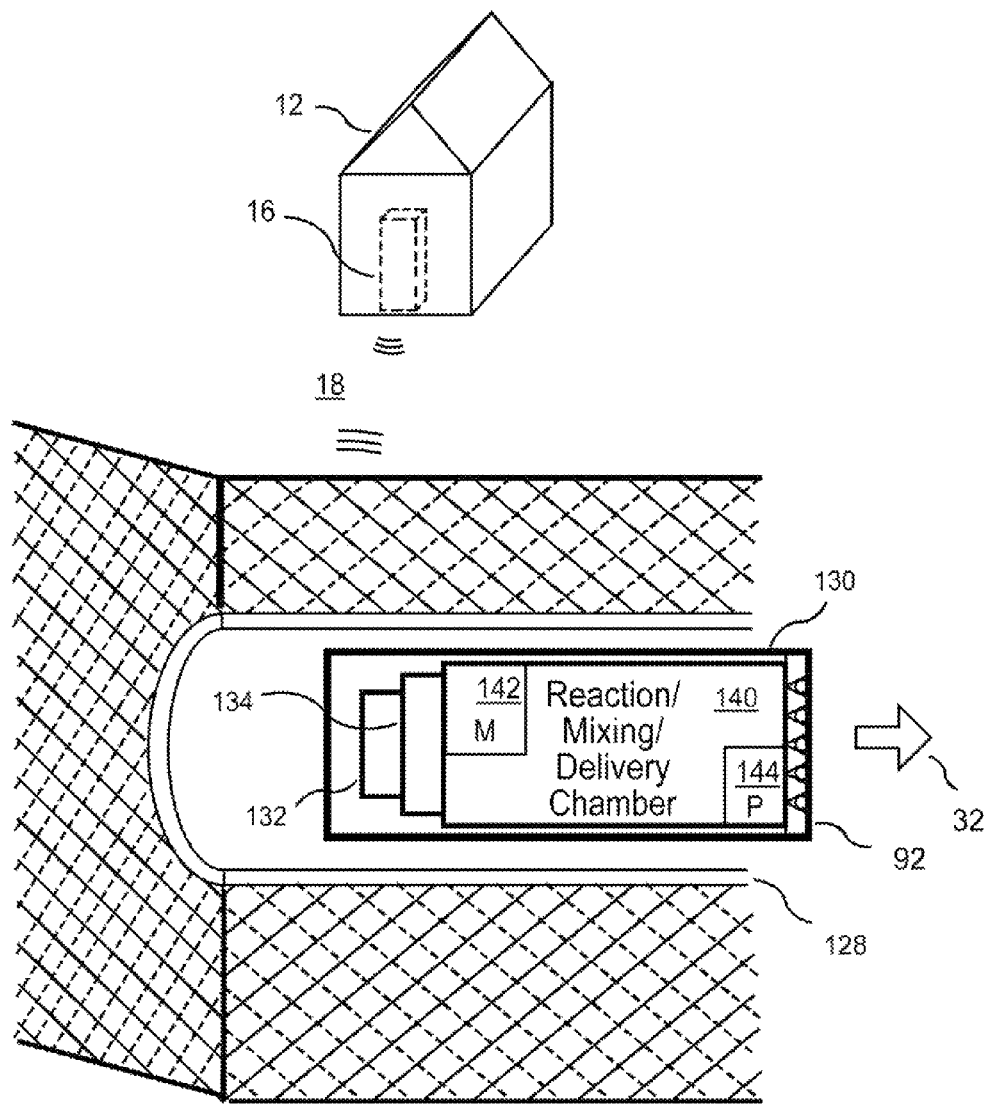
FIG. 6 is a diagrammatical illustration of a reagent processing and delivery system comprising a control facility and a single-chamber reagent processing vessel adapted for orientation in a horizontal casing, in accordance with still another aspect of the present invention.

In an alternative embodiment, shown in FIG. 6, a reagent processing vessel 130 may comprise a single, combined reaction/mixing/delivery chamber 140, the reagent processing vessel 130 here shown horizontally disposed in a borehole 128, although the reagent processing vessel 130 can also be adapted for vertical use in a well or the downhole site 28, as above. The reagent processing vessel 130 may operate via the EM wireless link 18 and coordinate operations using communication signals sent between a transceiver 132 in the reagent processing vessel 130 and the control station 16. A control module 134 is in electrical communication with the transceiver 132. Accordingly, the transceiver 132 functions to relay control signals from the control station 16 to the control module 134 so as to activate and control the operations in the reaction/mixing/delivery chamber 140.

The chemical formulation product 32 may be produced in the reaction/mixing/delivery chamber 140 by means of a motor 142 positioned and controlled to mix the ingredient reagents into the chemical formulation product 32. Accordingly, a pump 144 may be employed to expel the chemical formulation product 32 via the one or more flow ports 92 into the borehole 128.

In an alternative embodiment, the transceiver 132 may comprise a self-contained unit that responds to ambient pressure and temperature changes in the borehole 128 so as to initiate the control operations when a pre-determined set of pressure and temperature parameters has been reached. When the chemical formulation product 32 has been produced in response to the "triggering" pressure and temperature parameters, the chemical formulation product 32 may be ejected via the array of flow ports 92.

In an exemplary embodiment, the reagent processing vessel 130 may be designed to be automatically triggered at a pre-specified combination of ambient pressure of about 5000±1000 psi, and an ambient temperature of about 300°±100° F. These temperatures and pressures may be present at a depth of about 8,000 to about 12,000 feet. It should be understood that the particular parameters specified for initiation of the control operations can be set for any range of pressure/temperature combinations selected by a designer of a reagent processing and delivery system, such as the RPD system 102.

Figure 7:
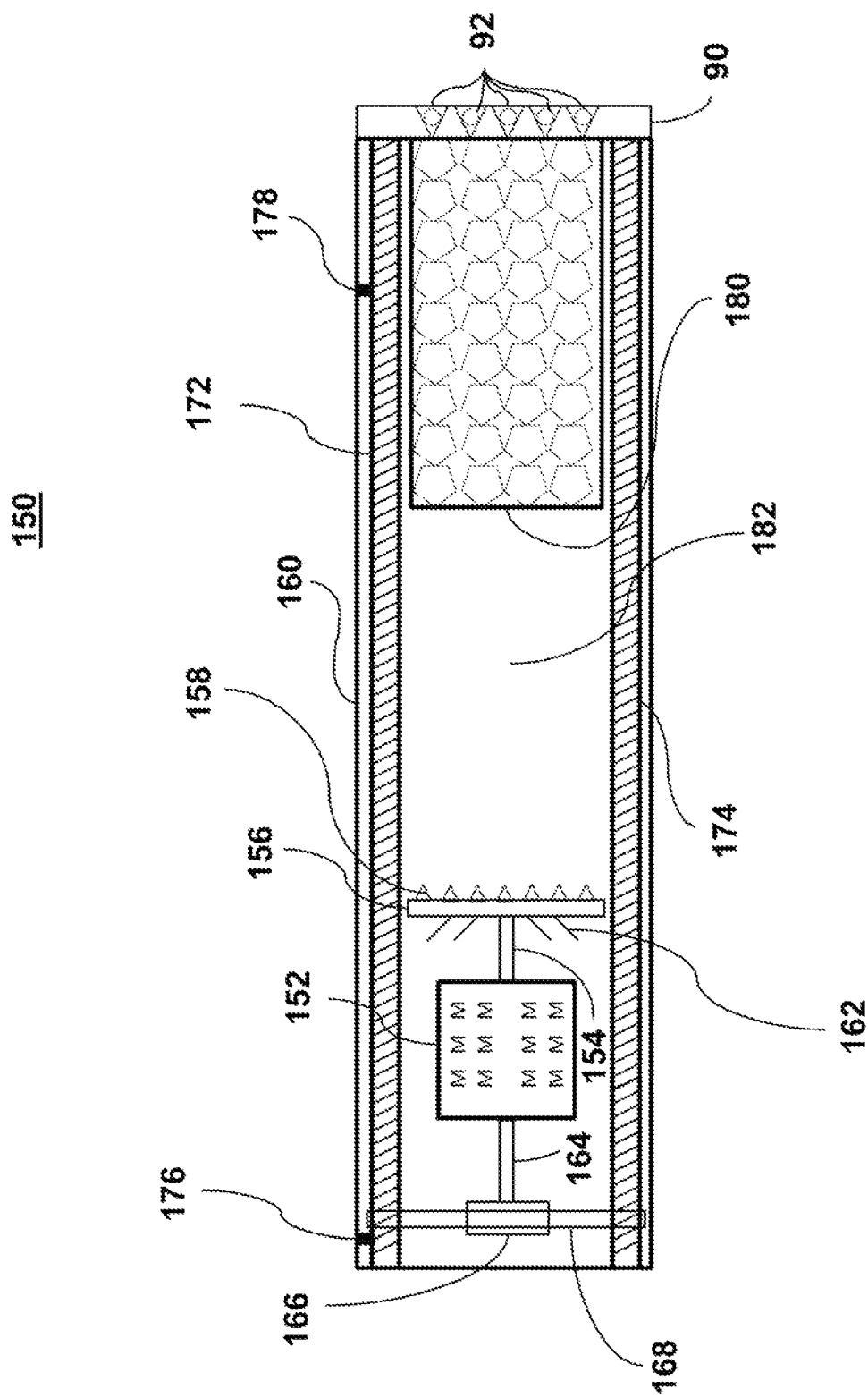
FIG. 7 is a cross-sectional functional schematic of an exemplary embodiment of a single-chamber self-contained reagent processing vessel having a grinding wheel for producing a suspension of solid reagent particles.

Referring to FIG. 7, there is shown a cross-sectional detailed view of an exemplary embodiment of a single-chamber reagent processing vessel 150. The reagent processing vessel 150 is configured to accommodate the processing and delivery of chemicals in either a vertical orientation, or a horizontal orientation as shown.

Preferably, a secure and closed container 160 comprising, for example, stainless steel or other compatible material for environment downhole, is utilized to house the internal components designed and emplaced to provide functionality to the reagent processing vessel 150. Mixing, grinding and flushing functionality is enabled at the front of the reagent processing vessel 150 by means of a motor 152 having a rearward shaft 154 connected to a grinding wheel 156. One face of the grinding wheel 156 may be covered with an array of grinding teeth 158. A second surface of the grinding wheel 156 may include a plurality of baffles 162 to assist in mixing functions.

A forward shaft 164 connects the motor to a centrifugal clutch 166. The centrifugal clutch 166 functions to selectively engage the motor 152 to a drive gear 168. One end of the drive gear 168 engages a first threaded guide support 172, and the other end of the drive gear 168 engages a second threaded guide support 174. The first and second threaded guide supports run approximately the length of the reagent processing vessel 150, and are fixed to the interior surface of the closed container 160.

Accordingly, when the motor 152 is powered by electrical current provided by an electrical cable, such as the electrical cable 24, the centrifugal clutch 166 may be engaged so as to cause the drive gear 168 to rotate on the threaded guide supports 172 and 174. This action may serve to transport the motor 152 and grinding wheel 156 (i) away from the front of the reagent processing vessel 150 and towards the rear of the reagent processing vessel 150, or (ii) from the rear of the reagent processing vessel 150 towards the front of the reagent processing vessel 150, as may be required for the intended operation of the reagent processing vessel 150.

A front reverse indicator 176 may be positioned proximate the front end of the first threaded guide support 172, as shown, or may be positioned proximate the front end of the second threaded guide support 174. When the drive gear 168 is moving from the rear of the reagent processing vessel 150 to the front of the reagent processing vessel 150, the drive gear 168 may activate the reverse indicator 176 and stop or reverse the motor 152. Similarly, a rear reverse indicator 178 may be positioned proximate the rear end of the first threaded guide support 172, as shown, or may be positioned proximate the rear end of the second threaded guide support 174. When the drive gear 168 is moving from the front of the reagent processing vessel 150 to the rear of the reagent processing vessel 150, the drive gear 168 may activate the rear reverse indicator 178 and stop motion, or reverse direction, as required.

The reagent processing vessel 150 further includes the flow control barrier 90 with the array of one-way flow ports 92 to provide for ejection of the chemical formulation product 32. In an exemplary embodiment, a block of solid reagent 180, such as a block of magnesium for example, may be disposed between the flow control barrier 90 and the grinding wheel 156. The volume in the reagent processing vessel 150 between the flow control barrier 90 and the grinding wheel 156 may be filled with a carrier fluid 182, such as diesel fluid. After the container 160 has been closed off, the reagent processing vessel 150 can be transported to a desired location, such as a storage facility or a project site.

Figure 8:
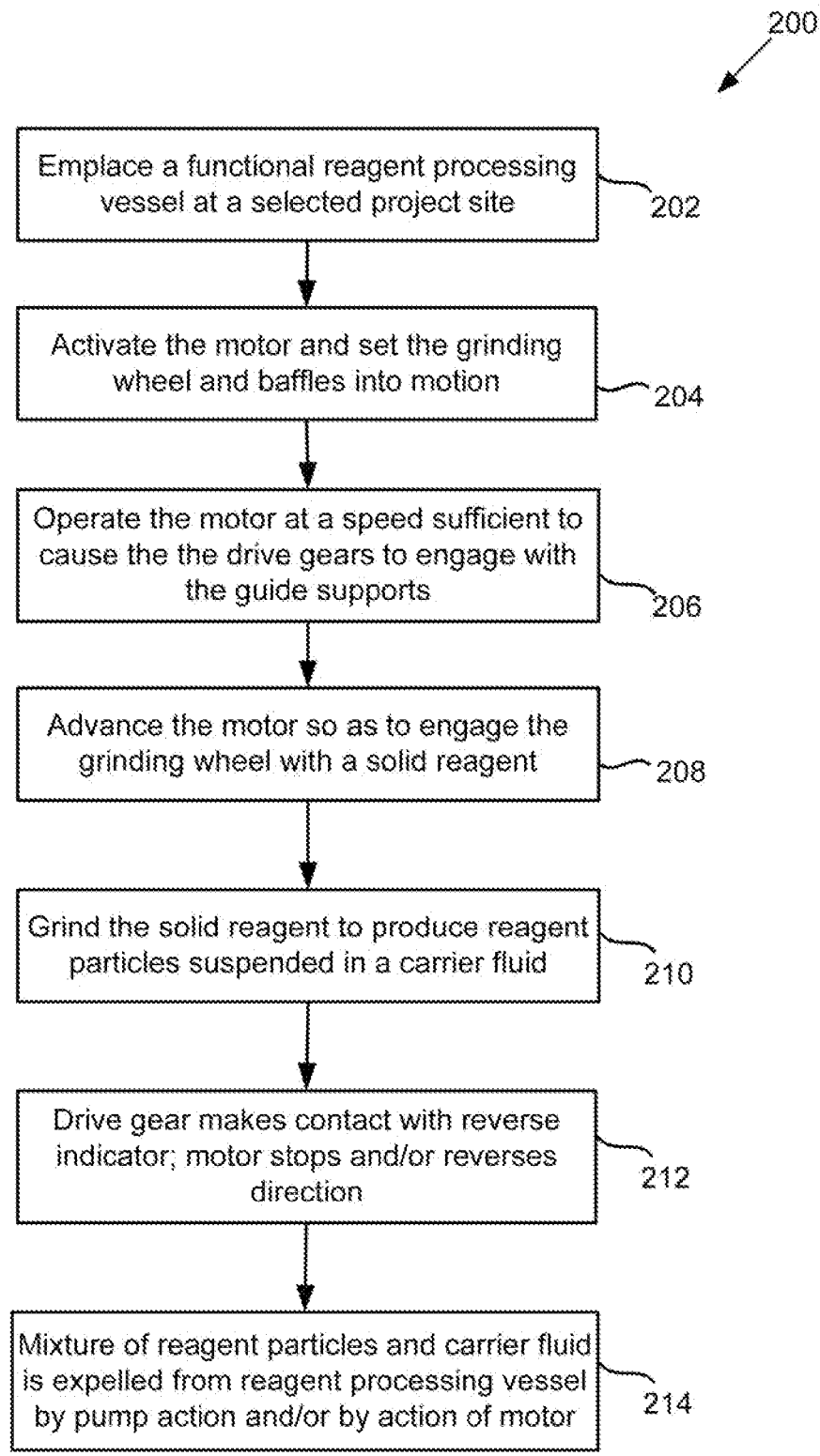
FIG. 8 is a flow chart illustrating operation of the reagent processing vessel of FIG. 7.

Operation of the reagent processing vessel 150 can be explained with reference to a flow diagram 200 in FIG. 8. After fabrication, the reagent processing vessel 150 may be emplaced in a selected site, such as the downhole site 28, or the borehole 128, for example, at step 202. The reagent processing vessel 150 may be activated, at step 204, and placed under control of, for example: (i) the control station 16, (ii) the control module 38, (iii) the control module 120, or (iv) the control module 134.

The motor 152 operates to turn the rearward shaft 154 and to rotate the grinding wheel 156, at step 204. As shown in the diagram, the grinding wheel 156 includes a plurality of grinding teeth 158 facing rearward, and a plurality of mixing baffles 162 facing forwards in the reagent processing vessel 150. If the grinding wheel 156 has minimal resistance, then the rearward shaft may turn at a rate of speed such that the centrifugal clutch 166 engages the drive gear 168 which is, in turn, engaged with the threaded guide supports 172 and 174, at step 206. Accordingly, the motor 152 travels within the reagent processing vessel 150, the direction of motion dependent on the rotational direction of the forward shaft 164. The rotational direction of the forward shaft 164 is reversed when the drive gear 168 comes into contact with either the front reverse indicator 176 or the rear reverse indicator 178.

When the motor 152 is rotating so as to advance the grinding wheel 156 in the direction of the solid reagent 180, the grinding teeth 158 may eventually come into contact with the solid reagent 180, at step 208. The motor will force the grinding teeth 158 against the solid reagent 180 so as to effect three actions: (1) particles of the solid reagent 180 may be formed, and may become suspended in the carrier fluid 182; (2) the mixing baffles 162 on the grinding wheel 156 may create a mixing, or a turbulence, of the carrier fluid 182, and particles of the solid reagent 180 may become distributed and suspended in the carrier fluid 182, at step 210; and (3) the resistance on the motor 152 produced by engaging the grinding wheel 156 against the solid reagent 180 will act to reduce the rotational speed of the forward shaft 164 such that the centrifugal clutch 166 does not engage and turn the drive gear 168. Accordingly, advancement of the grinding wheel 156 into the solid reagent 180 is slowed or halted.

As the surface of the solid reagent 180 is worn down by the action of the grinding wheel 156, the friction of the grinding wheel 156 on the solid reagent 180 is reduced, and the rotational speed of the motor 152 increases. The faster rotational speed of the motor 152 causes the forward shaft 164 to increase in rotational speed as well, and the centrifugal clutch 166 is thereby engaged. This action serves to again advance the grinding wheel 156 into the solid reagent 180. This repetitive movement of the grinding wheel 156 into the solid reagent 180 may continue until the drive gear 168 contacts the rear reverse indicator 178, at step 212.

As the drive gear 168 remains in contact with the rear reverse indicator 178, the one-way flow ports 92 are opened to allow expulsion of the particles of solid reagent 180 suspended in the carrier fluid 182, at step 214. For example, if a block of magnesium is used for the solid reagent 180, the expulsion of the carrier fluid 182 mixture into the site location results in a delivery of reactive magnesium particles to the interior of a downhole or horizontal borehole in an efficient and elegant manner, in comparison to conventional methods of delivery.

It can be appreciated by one skilled in the art that the movement of the motor 152 and the grinding wheel 156 toward the flow control barrier 90 results in an increased pressure of the carrier fluid 182 and suspended solid reagent particles against the flow control barrier. This assists in purging the reagent processing vessel 150 of the carrier fluid 182 and suspended solid reagent particle through the one-way flow ports 92. When the solid reagent 180 and carrier fluid 182 suspension has been delivered into the site location, the rotational direction of the motor 152 may thereby be reversed as a consequence of the drive gear 168 having made contact with the rear reverse indicator 178. Moreover, as the friction of the grinding teeth 158 against the solid reagent 180 is reduced or eliminated, the rotational speed of the forward shaft 164 increases so as to engage the centrifugal clutch 166. This engagement action results in movement of the motor 152 and the grinding wheel 156 away from the flow control barrier 90.

Figure 9:
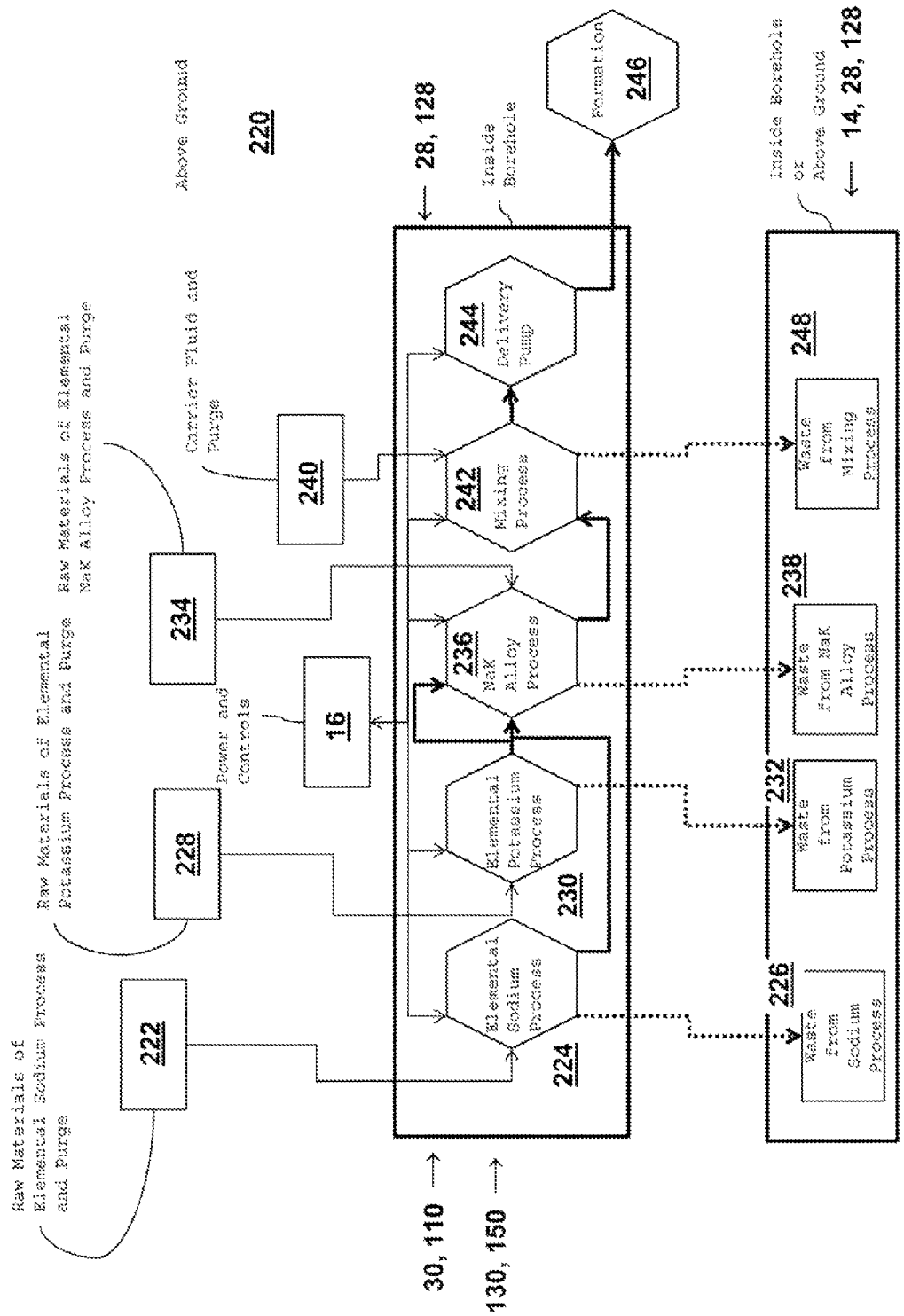
FIG. 9 is a functional diagram illustrating the production of a sodium-potassium alloy as can be performed in any of the reagent processing vessels of FIGS. 3, 4, 6 and 7.

In the functional diagram of FIG. 9, there is shown an operational diagram 220 illustrating a generalized method of producing a beneficial hazardous substance, as can be performed in any of the reagent processing vessels 30, 110, 130, and 150 described above. It should be understood that the selected reagent processing vessel 30, 110, 130, and 150 is deployed in one of the downhole 28 or in a horizontal well 128 sites. Each of the reagent processing vessels 30, 110, 130, and 150 may comprise electrochemical sensors, temperature sensors, pressure sensors, and other sensors, as is well known in the art, that allow the control station 16 to monitor the conditions, activate features, and initiate reaction events inside the reagent processing vessels 30, 110, 130, and 150. In accordance with the present invention, some processes may benefit by partially or fully purging the reagent processing vessels 30, 110, 130, and 150, along with periodic or continuous discharge of waste.

An example of such a beneficial hazardous product formation that can be produced in the reagent processing vessels 30, 110, 130, and 150 is a suspension of a sodium-potassium (NaK) alloy in a diesel carrier fluid. As can be appreciated by one skilled in the relevant art, a sodium-potassium alloy mixture with diesel fluid comprises a highly-reactive liquid substance. Moisture can cause the sodium-potassium particles to react, producing conditions conducive to fire or explosions. The disclosed method provides a process by which a sodium-potassium alloy suspension may be produced and dispensed in a safe and effective manner.

A pre-determined amount of raw materials 222 for an elemental sodium metal process and purge may be provided to, or stored inside, one of the reagent processing vessels 30, 110, 130, and 150. An elemental sodium process 224 may be conducted inside the selected reagent processing vessel 30, 110, 130, or 150. Waste 226 from the sodium process may be sent to the waste disposal facility 14, or may be expelled into the downhole 28 or the borehole 128.

A pre-determined amount of raw materials 228 for an elemental potassium metal process and purge may also be provided to, or stored inside, one of the reagent processing vessels 30, 110, 130, and 150. An elemental potassium process 230 may be conducted inside the selected reagent processing vessel 30, 110, 130, or 150. Waste 232 from the potassium process may also be sent to the waste disposal facility 14, or may be expelled into the downhole 28 or the borehole 128.

A pre-determined amount of additional raw materials 234 required for an elemental sodium-potassium alloy process and purge may then be provided to, or may have been stored inside, one of the reagent processing vessels 30, 110, 130, and 150. An elemental sodium-potassium process 236 may then be conducted using the products of the elemental sodium process 224 and the elemental potassium process 230. Waste 238 from the sodium-potassium alloy process may then be sent to the waste disposal facility 14, or may be expelled into the downhole 28 or the borehole 128.

A pre-determined amount of carrier fluid and purge substance 240 may be added to, or released inside of, one of the reagent processing vessels 30, 110, 130, and 150. A mixing process 242 may be conducted to produce the desired product formulation 246. A delivery pump 244 may expel the product formulation 246 into one of the downhole 28 or the borehole 128, and may also send waste 248 from the mixing process to the waste disposal facility 14, or into the downhole 28, or into the borehole 128. One or more of the 224, 230, 236, 242, and 244 may be conducted under control of the control station 16, as shown or, alternatively, under control of one of the control module 38, the control module 120, or the control module 134.

As can be appreciated by one skilled in the art, the above-disclosed methods and systems provide for design concepts that include: (i) a reagent processing vessel that may be adapted to fit into a well or horizontal casing; (ii) sensors provided inside the reagent processing vessel that serve to measure key operating parameters; (iii) additional features inside the reagent processing vessel that function to create environment/conditions that enable production of chemicals and other useful materials; (iv) sensors and features that are able to operate based on changes in state, such that control of system can be "self-contained" or a configuration in which the reagent processing vessel communicates with a computer in a control facility, the computer having both programmed logic and ability for a human operator to monitor and control the reagent processing vessel system.

Accordingly, the above-disclosed methods and systems may be designed and configured to provide a means of safely and/or remotely conducting chemical reactions that result in hazardous chemical products. Such chemical reactions may include, without limitation, reactions producing: (i) an alkali metal; (ii) an alkaline earth metal; (iii) an alkali metal hydride; (iv) an alkaline earth metal hydride; (v) a metal hydride; (vi) a complex hydride of an alkali metal and aluminum; (vii) a complex hydride of an alkaline earth metal and aluminum; (viii) a complex hydride of an alkali metal and lithium; (ix) a hydride of an alkaline metal and lithium; (x) a hydride of an alkali metal and boron; (xi) a hydride of an alkaline metal and boron; (xii) an alkali metal oxide; (xiii) an alkaline earth metal oxide; (xiv) an alkali metal hydroxide; (xv) an alkaline earth metal hydroxide; and (xvi) combinations of any of the above.

It is to be understood that the description herein is exemplary of the invention only and is intended to provide an overview for the understanding of the nature and character of the disclosed illumination systems. The accompanying drawings are included to provide a further understanding of various features and embodiments of the method and devices of the invention which, together with their description serve to explain the principles and operation of the invention.

What is claimed is:

1. A reagent processing vessel suitable for delivering a specified chemical mixture to a subterranean location, said vessel comprising:
    an outer container;
    a reaction chamber disposed in said outer container;
    a mixing chamber disposed in said outer container;
    a delivery chamber disposed in said outer container, said reaction chamber, said mixing chamber, and said delivery chamber forming a single reaction/mixing/delivery chamber;
    a grinding wheel for grinding a solid reagent disposed in said reaction/mixing/delivery chamber; and
    at least one of a mixing motor and a delivery pump.

2. The reagent processing vessel of claim 1 wherein said outer container is configured to withstand at least one of an ambient pressure of 4000 psi and an ambient temperature of 200° F.

3. The reagent processing vessel of claim 1 further comprising a chemical supply valve, said chemical supply valve disposed and configured to enable delivery of a selected substance into said reaction/mixing/delivery chamber.

4. The reagent processing vessel of claim 1 further comprising a flow control barrier proximate said delivery chamber, said flow control barrier configured so as to selectively allow a substance in said delivery chamber to be expelled external to said reagent processing vessel.

5. The reagent processing vessel of claim 4 wherein said flow control barrier comprises one or more one-way flow ports.

6. The reagent processing vessel of claim 1 wherein said mixing motor is emplaced and configured to mix substances delivered into said reaction/mixing/delivery chamber.

7. The reagent processing vessel of claim 1 wherein said pump is emplaced and configured to enable the expulsion of a substance from said reagent processing vessel.

8. The reagent processing vessel of claim 1 further comprising a motor, a drive gear, and a guide support for forcing said grinding wheel against said solid reagent.

9. The reagent processing vessel of claim 1 further comprising a crucible for conducting an electrolysis process inside the reagent processing vessel.

10. The reagent processing vessel of claim 1 further comprising:
a transceiver for communicating with a control station; and
a control module in electrical communication with said transceiver for activating and controlling operations inside said reagent processing vessel.

11. A reagent processing and delivery system suitable for delivering a specified substance to a subterranean location, said system comprising:
a control station;
an outer container including
a reaction chamber for receiving initial chemical substances and producing an ingredient reagent such that there is produced at least one of sodium metal and potassium metal in a crucible in said reaction chamber;
a mixing chamber in physical communication with said reaction chamber so as to allow transfer of said ingredient reagent produced in said reaction chamber into said mixing chamber;
a delivery chamber in physical communication with said mixing chamber so as to allow transfer of a chemical formulation product produced in said mixing chamber into said delivery chamber;
a flow control barrier in physical communication with said delivery chamber so as to enable expulsion of said chemical formulation product into the subterranean location; and
a control module in electrical communication with said control station so as to enable transmission of control signals to at least one of said reaction chamber, said mixing chamber, and said delivery chamber.

12. The reagent processing and delivery system of claim 11 further comprising an electrical cable disposed between said control station and said control module for providing electrical power and said control signals to at least one of said reaction chamber, said mixing chamber, and said delivery chamber.

13. The reagent processing and delivery system of claim 11 wherein said control module is configured for receiving wireless communication signals from said control station.

14. The reagent processing and delivery system of claim 11 further comprising a chemical delivery line connected to a chemical supply valve in said outer container for enabling delivery of said ingredient reagents to said reaction chamber.

15. The reagent processing and delivery system of claim 11 further comprising a waste disposal line connected to said outer container for enabling removal of waste products from said outer container.

16. A method for delivering a chemical formulation product to a subterranean location, said method comprising the steps of:
providing a reagent processing vessel;
delivering at least one initial chemical substance to said reagent processing vessel;
conducting at least one of a chemical reaction and a material processing action to produce an ingredient reactant in said reagent processing vessel such that there is produced at least one of sodium metal and potassium metal in a crucible disposed in said reagent processing vessel;
mixing said ingredient reactant with a carrier fluid to produce the chemical formulation product; and
expelling the chemical formulation product from said reagent processing vessel into the subterranean location.

17. The method of claim 16 wherein said step of conducting a chemical reaction is performed in response to the step of placing said reagent processing vessel in an environment having a pre-determined pressure and a pre-determined temperature.

18. The method of claim 16 wherein said step of mixing is performed in response to the step of providing electrical power to said reagent processing vessel via an electrical cable.

19. The method of claim 16 further comprising the step of expelling a waste product, said waste product produced in said step of conducting said chemical reaction.

* * * * *